United States Patent [19]

Komorita et al.

[11] 4,119,471

[45] Oct. 10, 1978

[54] OPTICAL GLASS

[75] Inventors: Fujio Komorita, Hachioji; Muneo Nakahara, Sagamihara, both of Japan

[73] Assignee: Kabushiki Kaisha Ohara Kogaku, Sagamihara, Japan

[21] Appl. No.: 856,459

[22] Filed: Nov. 30, 1977

[30] Foreign Application Priority Data

Dec. 17, 1976 [JP] Japan .................................. 51-150848

[51] Int. Cl.$^2$ ............................ C03C 3/08; C03C 3/10
[52] U.S. Cl. .................................. 106/47 Q; 106/54; 106/53
[58] Field of Search ........................... 106/47 Q, 54, 53

[56] References Cited

U.S. PATENT DOCUMENTS

| 3,740,242 | 6/1973 | Faulstick et al. | 106/47 Q |
| 3,958,999 | 5/1976 | Izunutani et al. | 106/47 Q |
| 3,964,918 | 6/1976 | Hares et al. | 106/47 Q |
| 4,066,464 | 1/1978 | Faulstick et al. | 106/47 Q |

*Primary Examiner*—O. R. Vertiz
*Assistant Examiner*—Mark Bell
*Attorney, Agent, or Firm*—Ladas, Parry, Von Gehr, Goldsmith & Deschamps

[57] ABSTRACT

An optical glass consisting basically of a $B_2O_3$ — $SiO_2$ — $La_2O_3$ — $ZrO_2$ — $TiO_2$ — $ZnO$ — $BaO$ system can be produced at a lower melting temperature and in a shorter melting time than it has heretofore been possible by replacing $Ta_2O_5$, $Nb_2O_5$ and $WO_3$ used in the conventional optical glasses with ZnO.

1 Claim, No Drawings

OPTICAL GLASS

BACKGROUND OF THE INVENTION

This invention relates to an optical glass having refractive indices (Nd) of about 1.71 to about 1.80 and Abbe values (νd) of about 46 to about 38 and consisting basically of a $B_2O_3$ — $SiO_2$ — $La_2O_3$ — $ZrO_2$ — $TiO_2$ — ZnO — BaO system.

Known in the art of the optical glass having the above described optical properties are ones consisting of a $B_2O_3$ — $SiO_2$ — $La_2O_3$ — $ZrO_2$ — $TiO_2$ — $Ta_2O_5$ (and/or $Nb_2O_5$ and/or $WO_3$) — divalent metal oxides system, as disclosed in U.S. Pat. No. 3,143,432, German Offenlegungsschrift No. 1,496,524 and Japanese Laid-open Publication Nos. 59116/1973, 88106/1973 and 101414/1975. These known optical glasses contain, as their essential ingredients, a $B_2O_3$ — $SiO_2$ — $La_2O_3$ divalent metal oxides system and further contain $ZrO_2$, $TiO_2$ and a relatively large quantity of $Ta_2O_5$ etc. which are added for preventing devitrification and achieving desired optical parameters. The optical glasses of this known system, however, are disadvantageous in that they require a relatively high temperature and a long time in melting and, besides, it is difficult to obtain a homogeneous optical glass which is substantially free of seeds.

SUMMARY OF THE INVENTION

It is, therefore, an object of the present invention to provide an optical glass which has eliminated the above described disadvantage of the prior art optical glasses.

Concentrated studies and repeated experiments made by the inventors of the present invention have resulted in a finding that an optical glass of a $B_2O_3$ — $SiO_2$ — $La_2O_3$ — $ZrO_2$ — $TiO_2$ — ZnO — BaO system in which $Ta_2O_5$, $Nb_2O_5$ and $WO_3$ used in the prior art optical glasses have been replaced with ZnO is low in viscosity, substantially free of bubbles or seeds and highly homogeneous and stable without sacrificing the desired optical properties.

According to the present invention, there is provided an optical glass consisting of a composition in weight percent of 8.5 to 20% $B_2O_3$, 10 to 19.5% $SiO_2$, the sum of said $B_2O_3$ and $SiO_2$ being 24 to 33%, 13 to 25% $La_2O_3$, 3 to 7.5% $ZrO_2$, 1 to 8% $TiO_2$, 5 to 26% ZnO, 25.5 to 37% BaO, 0 to 5% MgO, 0 to less than 6% CaO, 0 to 10% SrO, the sum of said ZnO, BaO, MgO, CaO and SrO being 36 to 53%, 0 to 5% PbO, 0 to 5% $Al_2O_3$ 0 to 2% $Li_2O$, 0 to 2% $Na_2O$, 0 to 2% $K_2O$, the amount of or the sum of the amounts of one or more ingredients of said $Li_2O$, $Na_2O$ and $K_2O$ being 0 to 2%, and 0 to 1% of at least one oxide of the group consisting of $As_2O_3$ and $Sb_2O_3$.

DETAILED DESCRIPTION OF THE INVENTION

In the optical glass made according to the present invention, the above mentioned composition is selected for reasons stated below.

As is well known, $B_2O_3$ and $SiO_2$ are essential glass forming ingredients. If the content of $B_2O_3$ is less than 8.5%, a devitrification tendency increases whereas if the content of $B_2O_3$ exceeds 20%, the refractive index decreases resulting in failure to achieve the desired optical properties. If the content of $SiO_2$ is less than 10%, the devitrification tendency increases whereas if the content of $SiO_2$ exceeds 19.5%, the refractive index decreases resulting in failure to achieve the required optical properties. If the sum of $B_2O_3$ and $SiO_2$ is less than 24%, forming of glass becomes difficult whereas if the sum of $B_2O_3$ and $SiO_2$ exceeds 33%, the desired optical properties cannot be realized.

$La_2O_3$ contributes to increasing the refractive index and decreasing the devitrification tendency and if the content of $La_2O_3$ is less than 13%, the desired optical properties cannot be achieved whereas increasing the content of $La_2O_3$ above 25% increases the devitrification tendency and results in failure to obtain a stable optical glass.

$ZrO_2$ contributes to increasing the refractive index and decreasing the devitrification tendency. If the content of $ZrO_2$ is less than 3%, the devitrification tendency increases whereas if the content of $ZrO_2$ exceeds 7.5%, the raw material becomes harder to melt resulting in occurrence of inhomogeneity in the produced glass.

$TiO_2$ is a useful ingredient for preventing devitrification, improving chemical durability and maintaining the desired optical properties. If the content of $TiO_2$ is less than 1%, the above mentioned effects of $TiO_2$ are extremely reduced whereas if the content of $TiO_2$ exceeds 8%, the produced glass is colored to an undesirable degree.

ZnO contributes to decreasing viscosity of glass in melting and thereby facilitating elimination of bubbles or seeds from the glass, ZnO further contributes to facilitating melting of $SiO_2$ into glass with a resulting prevention of devitrification and to improving chemical durability of the glass. If the content of ZnO is less than 5%, the above described effects of ZnO are extremely reduced whereas if the content of ZnO exceeds 26%, the devitrification tendency increases.

BaO is a useful ingredient for increasing the refractive index. If the content of BaO is less than 25.5%, the refractive index required in the present invention cannot be achieved whereas increasing the content of BaO above 37% increases the devitrification tendency and a stable optical glass cannot be obtained.

MgO, CaO and SrO have a function to reduce viscosity of glass in melting and also have a function to facilitate melting of the $SiO_2$ raw material. Further, MgO is useful for decreasing the devitrification tendency and increasing a water-resistance characteristic while CaO and SrO are useful for decreasing dispersion of the refractive index. For making a stable glass with sufficiently small devitrification tendency, the content of MgO must be up to 5%, that of CaO less than 6% and that of SrO up to 10%.

If the sum of ZnO, BaO, MgO, CaO and SrO is less than 36%, the optical properties required by the optical glass according to the present invention cannot be realized whereas if this sum exceeds 53%, the devitrification tendency increases and chemical durability decreases.

PbO is useful for increasing the refractive index and facilitating melting of $SiO_2$ but the glass will be undesirably colored if the content of PbO exceeds 5%.

$Al_2O_3$ is useful for improving chemical durability and facilitating melting of the $SiO_2$ material but increasing $Al_2O_3$ above 5% increases the devitrification tendency.

$Li_2O$, $Na_2O$ and $K_2O$ also are useful for facilitating melting of $SiO_2$ but if the content of one of these oxides or the sum of two or more of these oxides exceeds 2%, chemical durability decreases and the devitrification tendency increases.

$As_2O_3$ and/or $Sb_2O_3$ has a function of facilitating elimination of seeds in melting of glass but the content thereof should be up to 1%.

Compositions of the optical glass made according to the present invention are shown by way of example in Table 1 and compositions of the prior art optical glass having correspondingly substantially equal optical constants ($Nd$, $\theta d$) and containing $Ta_2O_5$, $Nb_2O_5$ and $WO_3$ etc. are shown in Table 2. In the respective tables, each component is shown in weight percent. These tables show numbers of seeds contained in the glasses 1.5 and 2.5 hours respectively after the component materials are poured into a platinum crucible which is maintained at a constant temperature of 1300° C. Each of the numbers of seeds in these tables is shown in terms of an average number of seeds in each unit section. This unit section is obtained by dividing a glass specimen into pieces each having a volume of 50cc, which glass specimen is obtained by mixing 1 kg of glass component materials, melting the mixture, pouring the melt in a mould and thereafter annealing the melt.

It will be understood from Table 1 and Table 2 that the glass compositions according to the present invention generally have a much smaller number of seeds remaining after melting than the prior art optical glass compositions and therefore can be readily refined. It has also been found that the glass compositions according to the present invention are lower in viscosity (log $\eta$) at 1300° C than the prior art compositions by 0.5 to 0.7.

Some other examples of the composition of the optical glass according to the present invention are shown in Table 3 in the same manner as in Table 1 except for the number of seeds which is a number measured 2.5 hour after filling in of the component materials into the crucible only. It will be appreciated that the optical glass shown in Table 3 can be refined as easily as the optical glass shown in Table 1.

Table 1

| No. | $B_2O_3$ | $SiO_2$ | $La_2O_3$ | $ZrO_2$ | $TiO_2$ | ZnO | BaO | $Al_2O_3$ | $Li_2O$ | Nd | $\nu d$ | 1.5 hr after melting | 2.5 hr after melting |
|---|---|---|---|---|---|---|---|---|---|---|---|---|---|
| 1 | 15.0 | 14.0 | 22.0 | 6.0 | 5.0 | 7.0 | 31.0 | | | 1.7619 | 42.7 | 14 | 2 |
| 2 | 15.0 | 17.0 | 14.0 | 5.0 | 7.0 | 14.0 | 26.0 | 2.0 | | 1.7328 | 38.3 | 57 | 3 |
| 3 | 14.0 | 11.0 | 24.0 | 7.0 | 2.5 | 15.0 | 26.5 | | | 1.7553 | 45.6 | 8 | 0 |
| 4 | 13.0 | 12.5 | 24.5 | 6.0 | 8.0 | 8.0 | 28.0 | | | 1.7999 | 38.6 | 10 | 0 |
| 5 | 8.5 | 18.5 | 13.5 | 6.0 | 1.0 | 26.0 | 26.0 | | 0.5 | 1.7318 | 45.0 | 16 | 2 |
| 6 | 14.0 | 17.0 | 18.5 | 3.0 | 7.5 | 10.0 | 30.0 | | | 1.7604 | 39.2 | 31 | 2 |
| 7 | 9.5 | 19.5 | 15.0 | 5.0 | 2.0 | 19.0 | 25.0 | 5.0 | | 1.7118 | 43.0 | 38 | 4 |

Table 2

| No. | $B_2O_3$ | $SiO_2$ | $La_2O_3$ | $ZrO_2$ | $TiO_2$ | $Ta_2O_5$ | $Nb_2O_5$ | $WO_3$ | BaO | | Nd | $\nu d$ | 1.5 hr after melting | 2.5 hr after melting |
|---|---|---|---|---|---|---|---|---|---|---|---|---|---|---|
| 1' | 14.5 | 17.5 | 24.5 | 6.0 | 5.5 | 3.0 | | | 26.0 | CaO 3.0 | 1.7620 | 42.6 | innumerable | innumerable |
| 2' | 17.0 | 16.0 | 17.0 | 7.0 | 5.0 | 9.0 | | 2.0 | 24.0 | $Al_2O_3$ 3.0 | 1.7328 | 38.3 | " | 73 |
| 3' | 25.5 | 10.0 | 39.5 | 8.0 | | 10.0 | | 4.0 | | CaO 3.0 | 1.7551 | 45.6 | " | 90 |
| 4' | 14.0 | 13.0 | 24.7 | 8.0 | 8.3 | 3.0 | | | 27.0 | CaO 2.0 | 1.8014 | 38.6 | " | 54 |
| 5' | 27.0 | 6.5 | 25.5 | 2.0 | | 8.0 | 2.5 | 2.5 | 25.0 | $Al_2O_3$ 1.0 | 1.7316 | 45.1 | " | 82 |
| 6' | 15.0 | 16.0 | 21.0 | 3.5 | 6.0 | 5.5 | | 3.0 | 25.0 | MgO 5.0 | 1.7609 | 39.2 | " | innumerable |
| 7' | 18.5 | 19.0 | 24.5 | 5.0 | 2.0 | 3.0 | 2.0 | 1.0 | 20.0 | SrO 5.0 | 1.7123 | 42.9 | " | " |

Table 3

| No. | $B_2O_3$ | $SiO_2$ | $La_2O_3$ | $ZrO_2$ | $TiO_2$ | ZnO | BaO | | | | | Nd | $\nu D$ | 2.5hr after melting |
|---|---|---|---|---|---|---|---|---|---|---|---|---|---|---|
| 1 | 10.0 | 17.5 | 20.5 | 6.0 | 3.5 | 8.0 | 28.0 | CaO 5.5 | $Al_2O_3$ 1.0 | | | 1.7442 | 44.0 | 4 |
| 2 | 20.0 | 10.0 | 17.0 | 7.0 | 3.5 | 10.0 | 26.5 | SrO 6.0 | | | | 1.7399 | 44.6 | 1 |
| 3 | 11.5 | 15.5 | 13.0 | 6.0 | 3.0 | 18.0 | 27.5 | MgO 5.0 | | $As_2O_3$ 0.5 | | 1.7381 | 43.2 | 3 |
| 4 | 10.5 | 17.0 | 25.0 | 3.5 | 3.5 | 5.0 | 32.5 | CaO 2.5 | $Al_2O_3$ 0.5 | | | 1.7460 | 44.8 | 6 |
| 5 | 10.5 | 14.0 | 17.0 | 4.5 | 3.0 | 15.0 | 36.0 | | | | | 1.7490 | 43.4 | 2 |
| 6 | 12.0 | 17.5 | 18.9 | 4.0 | 3.0 | 8.0 | 31.5 | | PbO 5.0 | $As_2O_3$ 0.1 | | 1.7605 | 41.2 | 4 |
| 7 | 16.5 | 10.5 | 14.0 | 4.0 | 4.0 | 21.0 | 28.0 | | | $K_2O$ 2.0 | | 1.7331 | 43.0 | 0 |
| 8 | 10.5 | 18.0 | 17.0 | 4.5 | 5.0 | 13.5 | 30.0 | | $Na_2O$ 1.5 | | | 1.7455 | 41.6 | 5 |
| 9 | 14.0 | 13.5 | 23.0 | 6.0 | 6.0 | 7.5 | 30.0 | | | | | 1.7767 | 40.7 | 0 |
| 10 | 12.5 | 15.0 | 19.5 | 6.0 | 1.0 | 20.0 | 26.0 | | | | | 1.7378 | 45.9 | 1 |
| 11 | 10.0 | 14.0 | 18.0 | 5.0 | 4.0 | 14.0 | 35.0 | | | | | 1.7590 | 42.0 | 1 |
| 12 | 18.0 | 15.0 | 17.0 | 6.0 | 4.5 | 12.0 | 26.0 | $Li_2O$ 0.5 | $Na_2O$ 0.5 | $K_2O$ 0.5 | | 1.7275 | 43.0 | 0 |

Table 3-continued

| No. | $B_2O_3$ | $SiO_2$ | $La_2O_3$ | $ZrO_2$ | $TiO_2$ | ZnO | BaO | | | Optical properties Nd | $\nu D$ | Number of seeds 2.5hr after melting |
|---|---|---|---|---|---|---|---|---|---|---|---|---|
| 13 | 11.5 | 14.0 | 15.0 | 4.0 | 2.5 | 16.0 | 37.0 | | | 1.7385 | 43.7 | 2 |
| 14 | 14.5 | 16.5 | 20.5 | 7.5 | 3.5 | 12.0 | 25.5 | | | 1.7421 | 44.3 | 3 |
| 15 | 12.0 | 13.5 | 17.0 | 4.5 | 3.0 | 14.0 | 26.0 | SrO 10.0 | | 1.7315 | 43.6 | 1 |
| 16 | 14.5 | 13.5 | 16.0 | 5.0 | 4.0 | 18.0 | 28.0 | | $Sb_2O_3$ 1.0 | 1.7448 | 40.8 | 1 |

As described in the foregoing, the optical glass according to the present invention has optical properties of refractive indices (Nd) of about 1.71 to about 1.80 and Abbe values ($\nu d$) of about 46 to about 38 and consists basically of a $B_2O_3$ — $SiO_2$ — $La_2O_3$ — $ZrO_2$ — $TiO_2$ — ZnO — BaO system without using $Ta_2O_5$, $Nb_2O_5$, $WO_3$ and other oxides contained in the prior art optical glasses having substantially equal optical properties. The optical glass according to the invention is lower in viscosity than the prior art optical glasses and has achieved a drop in the melting temperature from about 1350° – 1400° C to about 1250° – 1350° C. The optical glass according to the invention has also achieved sufficient homogenization and elimination of seeds with curtailment of a melting time including time required for stirring by about 30% to 50%. Accordingly, wear and tear of a glass melting apparatus can be reduced and yield of glass increased. Furthermore, heat consumption and working time can be saved and costs of raw materials can be greatly reduced.

What is claimed is:

1. An optical glass consisting of a composition in weight percent of 8.5 to 20% $B_2O_3$, 10 to 19.5% $SiO_2$, the sum of said $B_2O_3$ and $SiO_2$ being 24 to 33%, 13 to 25% $La_2O_3$, 3 to 7.5% $ZrO_2$, 1 to 8% $TiO_2$, 5 to 26% ZnO, 25.5 to 37% BaO, 0 to 5% MgO, 0 to less than 6% CaO, 0 to 10% SrO, the sum of said ZnO, BaO, MgO, CaO and SrO being 36 to 53%, 0 to 5% PbO, 0 to 5% $Al_2O_3$, 0 to 2% $Li_2O$, 0 to 2% $Na_2O$, 0 to 2% $K_2O$, the amount of or the sum of the amounts of one or more ingredients of said $Li_2O$, $Na_2O$ and $K_2O$ being 0 to 2%, and 0 to 1% of at least one oxide of the group consisting of $As_2O_3$ and $Sb_2O_3$.

* * * * *